United States Patent Office 2,722,551
Patented Nov. 1, 1955

2,722,551

ALANYLAMINOETHANEMERCAPTO COMPOUNDS AND METHOD FOR OBTAINING THE SAME

Esmond E. Snell, Austin, Tex., and Eugene L. Wittle and James A. Moore, Detroit, Mich., assignors to Parke, Davis & Company, Detroit, Mich., a corporation of Michigan No Drawing. Application September 18, 1952,
Serial No. 310,361

7 Claims. (Cl. 260—561)

This application is a continuation-in-part of our co-pending application Serial No. 191,936, filed October 24, 1950, now Patent 2,680,767, and the invention relates to new organic sulfur compounds and to methods for obtaining the same. More particularly, the invention relates to organic sulfur compounds having the formula,

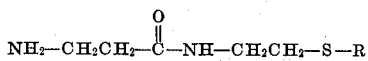

where R is hydrogen or the radical $NH_2—CH_2CH_2—CO—NH—CH_2CH_2—S—$ and to acid addition salts of these products.

In accordance with the invention, the new organic sulfur compounds having the formula given above are produced by reacting N-carbobenzoxyalanyl chloride with bis(2-aminoethyl)disulfide, reducing the bis[N-(N-carbobenzoxy-β-alanyl)-2-aminoethyl]disulfide so obtained with phosphonium iodide, treating the acid addition salt of N-(β-alanyl)-2-aminoethyl mercaptan with alkali and, if desired, oxidizing said mercaptan to bis[N-(β-alanyl)-2-aminoethyl]disulfide. These transformations can be diagrammatically illustrated as follows:

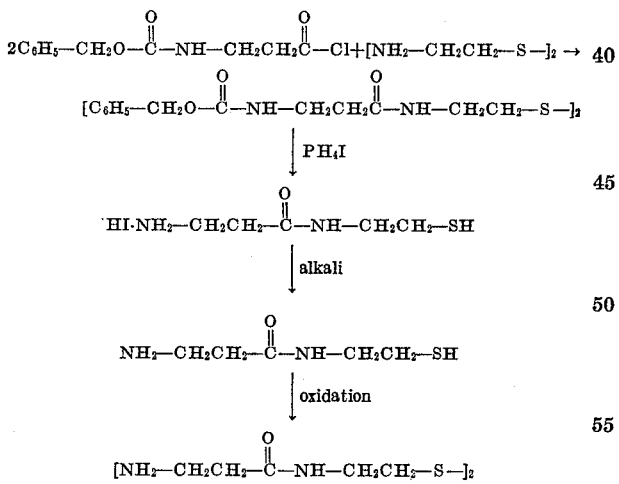

The reaction of the N-carbobenzoxyalanyl chloride with bis(2-aminoethyl)disulfide is carried out in an inert organic solvent such as ether, dioxane, benzene, toluene and the like in the presence of at least one equivalent of an alkaline substance such as sodium hydroxide, potassium hydroxide, potassium carbonate, sodium bicarbonate, triethylamine, dimethylaniline, pyridine and the like. The reaction is usually carried out below 25° C. and preferably in the neighborhood of 0 to 15° C. In most instances it is more convenient to employ the bis (2-aminoethyl)disulfide in the form of an acid addition salt, and when this is done sufficient of the alkaline material is added to the reaction mixture to liberate the free amine and also to react with the hydrogen chloride formed during the reaction.

The reduction of the bis[N-(N-carbobenzoxy-β-alanyl)-2-aminoethyl]disulfide and removal of the carbobenzoxy groups to produce N-(β-alanyl)-2-aminoethyl mercaptan hydroiodide is carried out by warming the disulfide with phosphonium iodide. The temperature is not particularly critical, but best results are obtained in the temperature range of 40 to 70° C. As a solvent, glacial acetic acid is usually used. The N-(β-alanyl)-2-aminoethyl mercaptan hydroiodide so obtained is treated with alkali, preferably in the absence of air, to obtain the free base of N-(β-alanyl)-2-aminoethyl mercaptan. This free base is relatively stable in the solid form but when impure or in solution it is readily oxidized by atmospheric oxygen to bis[N-(β-alanyl)-2-aminoethyl]disulfide. The oxidation of the mercaptan to the disulfide can also be carried out by dissolving the mercaptan in a solvent and adding hydrogen peroxide or iodine. If desired, the disulfide can be converted into N-(β-alanyl)-2-aminoethyl mercaptan by reduction with sodium in liquid ammonia.

The products of the invention are useful intermediates in the production of the growth factors known as pantethine and pantetheine. These growth factors can be obtained by condensing the products of this invention with pantolactone using one equivalent with the mercaptan or two equivalents of the pantolactone with the disulfide product of this invention.

The invention is illustrated by the following examples.

Example 1

N-carbobenzoxy-β-alanylchloride is prepared by treating 3.36 g. of N-carbobenzoxyalanine in 15 ml. of dry benzene with 3.5 ml. of thionyl chloride. The solution is warmed and evaporated to a small volume and the residual oil is dissolved in ether, filtered through a filter aid to remove a trace of amorphous material and again evaporated.

The N-carbobenzoxyalanyl chloride is taken up in 25 ml. of anhydrous dioxane. This solution is added slowly to a cold (0–15° C.) solution containing 1.69 g. of bis (2-aminoethyl)disulfide dihydrochloride in 15 ml. of 1N sodium hydroxide solution. Another 15 ml. of the 1N sodium hydroxide is added concurrently with the acyl chloride. The bis[N-(N-carbobenzoxyalanyl)-2-aminoethyl]disulfide forms as a white precipitate which is filtered off and dried. A portion is recrystallized from methanol; M. P. 179–180° C.

1.0 g. of bis[N-(N-carbobenzoxyalanyl)-2-aminoethyl]disulfide is dissolved in 20 ml. of glacial acetic acid. To this solution is added 1.2 g. of phosphonium iodide and the mixture is warmed to 50° C. for three hours and then allowed to stand overnight. The acetic acid solution is decanted from the brown amorphous solid, the acetic acid is distilled in vacuo and the residue extracted with 30 ml. of ether to remove the benzyl iodide. The N-(β-alanyl)-2-aminoethyl mercaptan is oxidized with 0.5 ml. of 15 per cent hydrogen peroxide, the resulting oil treated with 8 g. of potassium hydroxide in 10 ml. of water and the solution extracted with ether. The ether solution of the free base of bis[N(β-alanyl)-2-aminoethyl]disulfide is taken down to a small volume and treated with anhydrous hydrogen chloride. The hydrochloride salt of bis[N(β-alanyl)-2-aminoethyl]disulfide which separates is recrystallized from methanol-acetone mixture; M. P. 216–218° C.

Example 2

To a solution of 1.0 g. of bis[N(N-carbobenzoxy-β-alanyl)-2-aminoethyl]disulfide in 20 cc. of glacial acetic acid is added 1.0 g. of phosphonium iodide. The solution is sealed from moisture and heated in a bath at 50–60° C. for four hours with occasional shakings. The solution is then filtered, and the tan insoluble product washed with a few cc. of acetic acid. The clear filtrate is evaporated to dryness in a current of nitrogen at 50–60° C. The clear residue which is the hydroiodide salt of N-(β-alanyl)-2-aminoethyl mercaptan is dissolved in a few cc. of methanol and 3.5 cc. of 1.0 N sodium hydroxide solution is added. The solution is again evaporated to dryness in a molecular still pot with a current of nitrogen in a bath at 60° C. and the solid residue dried in a vacuum dessicator over calcium chloride for a few hours. The solid is then distilled in a molecular still at $10^{-3}$ to $10^{-5}$ mm. and at a bath temperature of 80–120° C. The slightly oily white solid N-(β-alanyl)-2-aminoethyl mercaptan which collects on the cold finger is removed with a little methanol, dried with a current of nitrogen and redistilled in a molecular still at a pressure of $10^{-4}$ mm. and a bath temperature of 60 to 80° C. The N(β-alanyl)-2-aminoethyl mercaptan sublimes to the condenser as a white solid; M. P. 80–90° C. It can be purified further by crystalliaztion from methanol-ether; M. P. 95–98° C.

*Example 3*

To a solution of 3.67 g. of bis[N(β-alanyl)-2-aminoethyl)disulfide dihydrochloride in 75 cc. of liquid ammonia is added in small portions with shaking 920 mg. of metallic sodium. The solution turns blue with the last addition of sodium and 1.07 g. of ammonium chloride is then carefully added to the cold solution. The ammonia is then allowed to evaporate and the dry residue is warmed to 50° C. for fifteen minutes. The residue is boiled with 50 cc. of absolute ethanol and filtered under nitrogen and diluted with 150 cc. of dry ether. After standing for several hours, 600 mg. of N(β-alanyl)-2-aminoethyl mercaptan crystallizes from the solution as a white solid; M. P. 96–100° C. After purification by vacuum sublimation the N(β-alanyl)-2-aminoethyl mercaptan melts at 95–97° C.

What we claim is:

1. A compound of the class consisting of a free base and its acid addition salts, said free base having the formula,

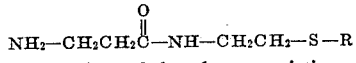

where R is a member of the class consisting of hydrogen and the radical

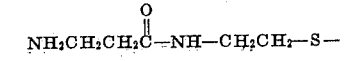

2. N-(β-alanyl)-2-aminoethyl mercaptan.
3. Bis[N-(β-alanyl)-2-aminoethyl]disulfide.
4. The hydrochloride salt of bis[N-(β-alanyl)-2-aminoethyl]disulfide.
5. The hydroiodide salt of N-(β-alanyl)-2-aminoethyl mercaptan.
6. Process for obtaining N-(β-alanyl)-2-aminoethyl mercaptan which comprises reacting N-carbobenzoxy-alanyl chloride with bis(2-aminoethyl)disulfide, reducing the bis[N - (N-carbobenzoxy-β-alanyl)-2-aminoethyl]disulfide so obtained with phosphonium iodide and treating the acid addition salt of N-(β-alanyl)-2-aminoethyl mercaptan with alkali.
7. Process according to claim 6 in which the mercaptan compound thus obtained is oxidized to bis[N-(β-alanyl)-2-aminoethyl]disulfide.

References Cited in the file of this patent

Williams: "J. Biol. Chem.," vol. 177 (1949) pp. 933 to 940.

Braun et al.: "Ber. deut. Chem.," vol. 62 (1929), pp. 2767 and 2772.